United States Patent
Sonoda et al.

(10) Patent No.: US 8,853,607 B2
(45) Date of Patent: Oct. 7, 2014

(54) SOLID-STATE IMAGE PICKUP APPARATUS AND IMAGE PICKUP SYSTEM

(75) Inventors: Kazuhiro Sonoda, Yokohama (JP); Shintaro Takenaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 13/308,058

(22) Filed: Nov. 30, 2011

(65) Prior Publication Data

US 2012/0145881 A1    Jun. 14, 2012

(30) Foreign Application Priority Data

Dec. 13, 2010  (JP) ................................ 2010-277295

(51) Int. Cl.
*H01L 27/00* (2006.01)
*H04N 7/18* (2006.01)
*H04N 3/14* (2006.01)

(52) U.S. Cl.
USPC .................... 250/208.1; 348/138; 348/309

(58) Field of Classification Search
USPC ............... 250/208.1, 214.1, 559.47; 348/138, 348/309, 311, 312, 313; 345/74, 147, 204, 345/213
See application file for complete search history.

(56) References Cited

U.S. PATENT DOCUMENTS 4,484,224 A * 11/1984 Sato et al. .................... 348/312
2007/0085922 A1    4/2007  Kido

FOREIGN PATENT DOCUMENTS

| CN | 1870729 A | 11/2006 |
|---|---|---|
| CN | 101690158 A | 3/2010 |
| GB | 2486775 A | 6/2012 |
| JP | 2001-069406 A | 3/2001 |
| JP | 2004-023615 A | 1/2004 |
| JP | 2006-345368 A | 12/2006 |
| JP | 2007-194981 A | 8/2007 |
| JP | 2009-071426 A | 4/2009 |
| JP | 2009-260809 A | 11/2009 |
| JP | 2010-088019 A | 4/2010 |

* cited by examiner

*Primary Examiner* — Georgia Y Epps
*Assistant Examiner* — Don Williams
(74) *Attorney, Agent, or Firm* — Canon USA, Inc. IP Division

(57) ABSTRACT

In a solid-state image pickup apparatus including a pixel array having pixels each including photoelectric conversion element arranged in a matrix, a synchronization signal generation unit generates a horizontal synchronization signal to define a first horizontal period and a second horizontal period different in length from the first horizontal period. Based on the horizontal synchronization signal, a reset scanning circuit sequentially selects and resets pixels in rows of the pixel array, and a readout scanning circuit sequentially selects pixels and reads a pixel signal therefrom. In each pixel, the charge is accumulated in a charge accumulation period starting when the resetting is performed and ending when the pixel signal is read. In one vertical period, the first horizontal period and the plurality of second horizontal period both appear a plurality of times, wherein the second horizontal period appears periodically.

11 Claims, 15 Drawing Sheets

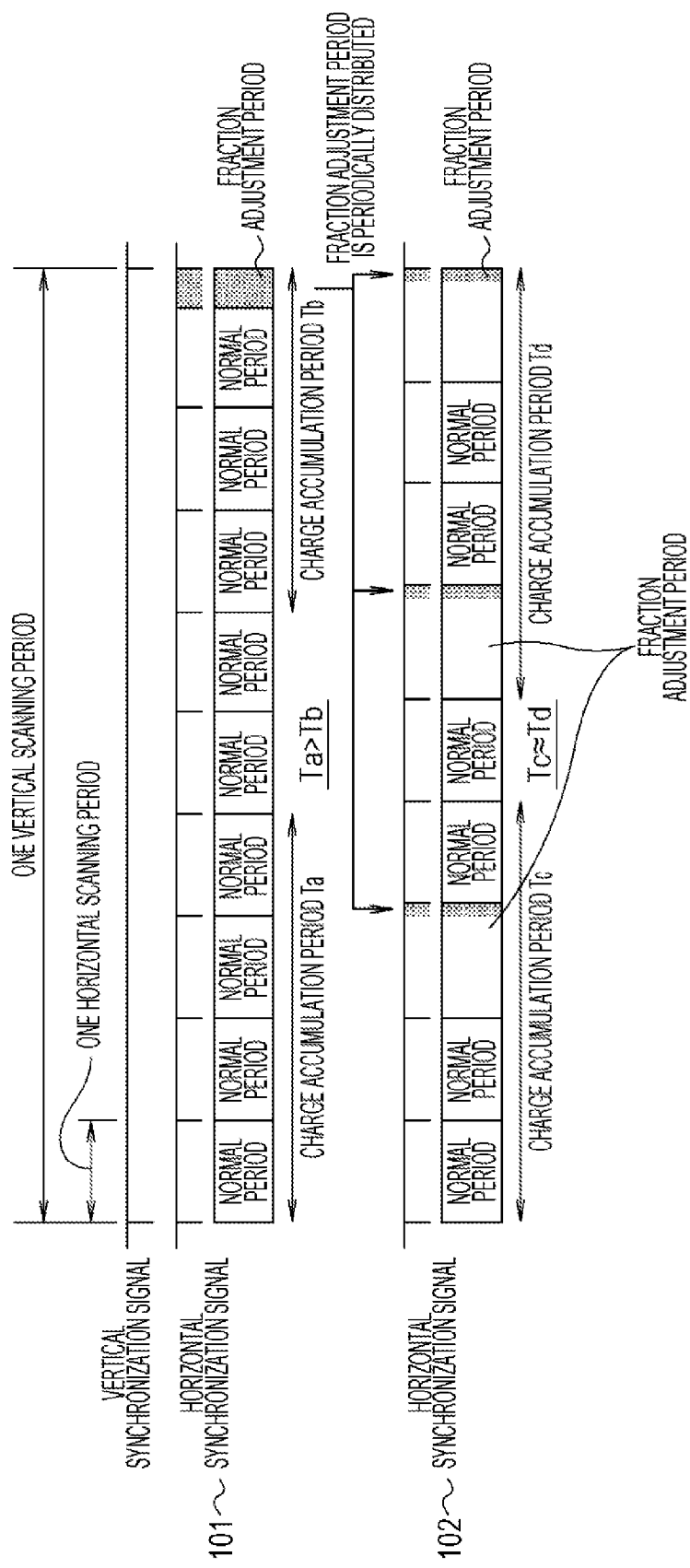

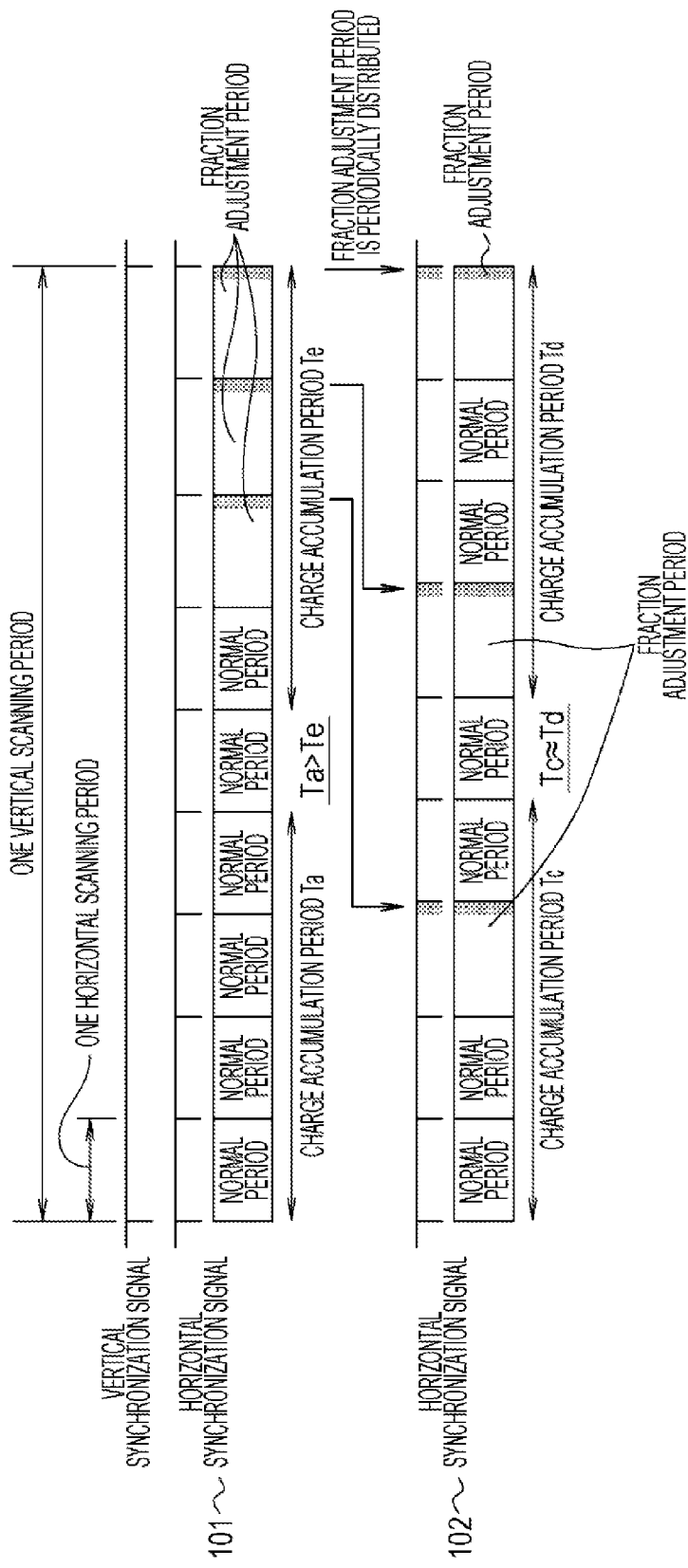

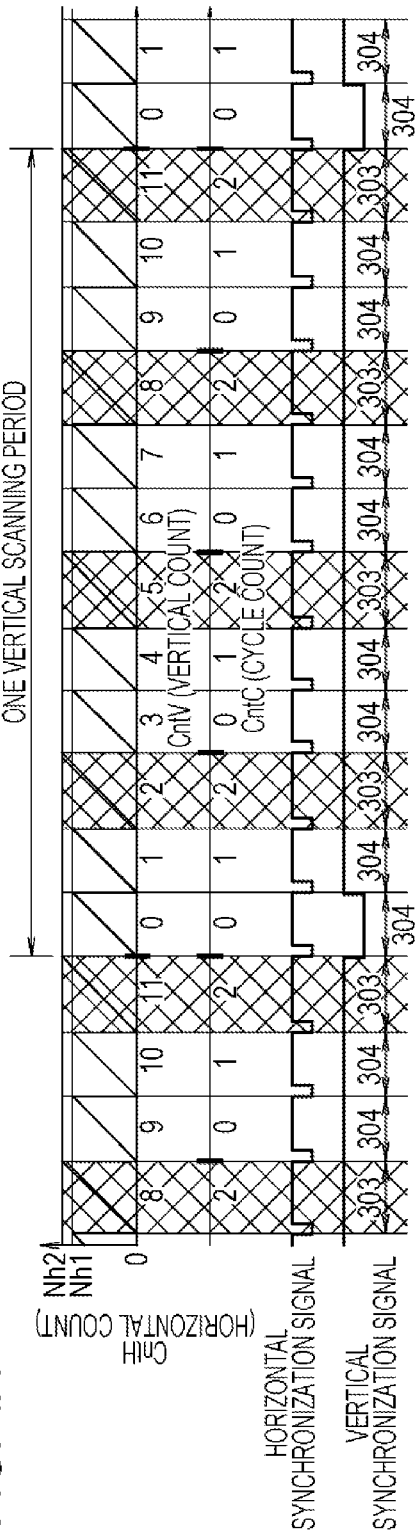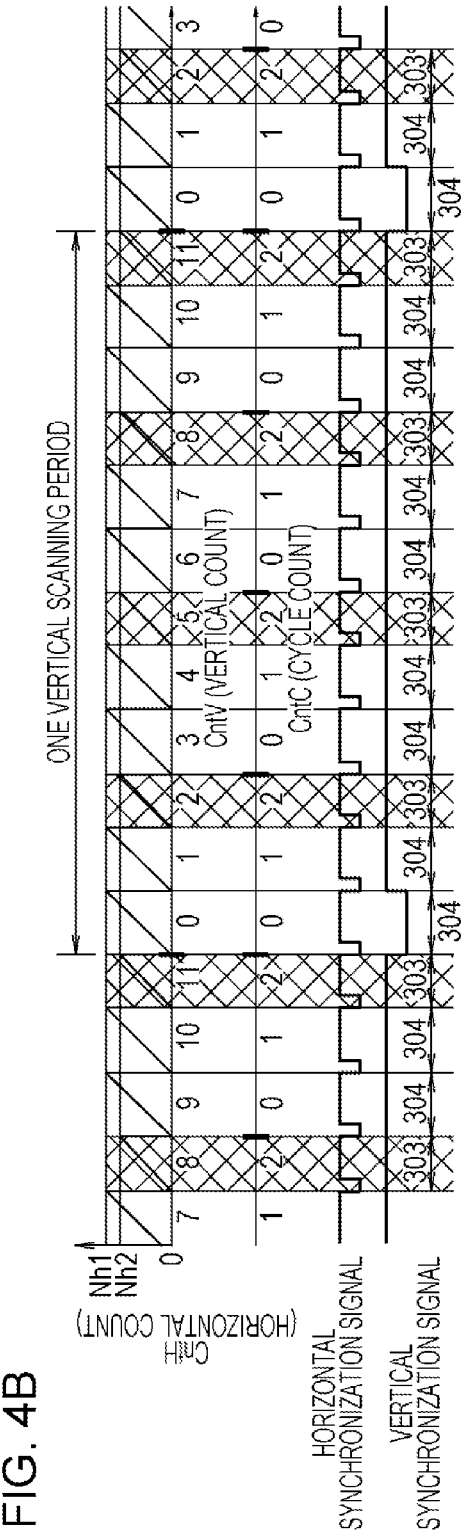

SOLID-STATE IMAGE PICKUP APPARATUS AND IMAGE PICKUP SYSTEM

BACKGROUND OF THE INVENTION

1. Field of the Invention

The present invention relates to a solid-state image pickup apparatus and an image pickup system.

2. Description of the Related Art

In a solid-state image pickup apparatus using a CMOS-type image sensor, it is known to provide a focal plane electronic shutter function. The electronic shutter function refers to a function to reset a signal charge storage region in a photodiode in each pixel before the photodiode starts to store a signal charge generated via a photoelectric conversion thereby to achieve the ability to change the charge accumulation period of the photodiode. In the focal plane electronic shutter, a large number of pixels arranged in a two-dimensional array are scanned and reset sequentially from one pixel row to the next in synchronization with a horizontal synchronization signal. After a particular period of time has elapsed, signal charges stored in pixels are sequentially read row by row. The "particular period of time" described above is called a charge accumulation period of the photodiode, and the charge accumulation period is equal for any row as long as the intervals of the horizontal synchronization signal (horizontal period) are maintained constant. On the other hand, as described in Japanese Patent Laid-Open No. 2004-023615, to remove flicker noise, it is known to adjust the length of one vertical period by providing a fraction adjustment period and changing the length of the horizontal period by changing a count value of a fraction count.

Suppose a case where the adjustment of the length of one vertical period by changing the horizontal period by providing the fraction adjustment period is performed in a solid-state image pickup apparatus having the focal plane electronic shutter function, as described in Japanese Patent Laid-Open No. 2004-023615. In this case, a difference can occur in charge accumulation periods between a region including a fraction adjustment period and a region including no fraction adjustment period. If the difference in length between the fraction adjustment period and the normal period increases, this results in an increase in difference in pixel signal levels between the region in which the charge accumulation period includes a fraction adjustment period and the region in which there is no fraction adjustment period, which causes a problem of degradation in image quality.

SUMMARY OF THE INVENTION

The present invention provides a solid-state image pickup apparatus including a pixel array in which pixels each including photoelectric conversion element for converting light into a charge are disposed in a two-dimensional array, a synchronization signal generation unit that generates a horizontal synchronization signal having a pulse interval corresponding to a first horizontal period and a pulse interval corresponding to a second horizontal period different in length from the first horizontal period, a reset scanning circuit that, based on the horizontal synchronization signal, sequentially selects pixels in rows of the pixel array and resets a charge accumulated in the photoelectric conversion element, and a readout scanning circuit that, based on the horizontal synchronization signal, sequentially selects pixels in rows of the pixel array and reads a pixel signal, wherein in each pixel, the charge is accumulated in a charge accumulation period starting when the resetting is performed by the reset scanning circuit and ending when the reading is performed by the readout scanning circuit, and wherein in one vertical period defined by a pulse interval of a vertical synchronization signal, the horizontal synchronization signal is generated such that the first horizontal period and the second horizontal period both appear a plurality of times and such that the second horizontal period appears periodically.

Further features of the present invention will become apparent from the following description of exemplary embodiments with reference to the attached drawings.

BRIEF DESCRIPTION OF THE DRAWINGS

FIGS. 1A and 1B are conceptual diagrams illustrating a process associated with a solid-state image pickup apparatus according to an embodiment of the present invention.

FIGS. 4A and 4B are schematic diagrams illustrating relationships among a count, a vertical synchronization signal, and a horizontal synchronization signal.

DESCRIPTION OF THE EMBODIMENTS

First Embodiment

Figure 2:
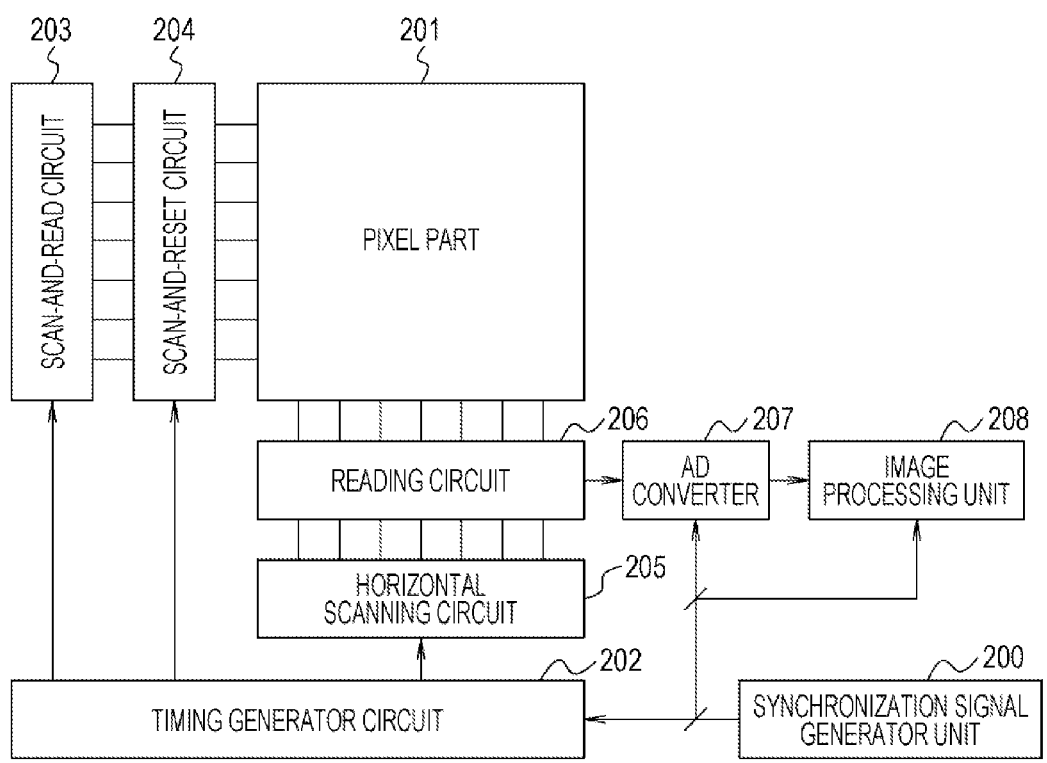
FIG. 2 is a diagram illustrating an example of a configuration of a solid-state image pickup apparatus according to an embodiment of the present invention.

FIGS. 1A and 1B are conceptual diagrams illustrating a principle of a processing associated with a solid-state image pickup apparatus according to a first embodiment of the present invention. 101 illustrates a comparative example, while 102 illustrates the present embodiment. In the present embodiment, a fraction adjustment period, which is a remainder that occurs when one vertical period is divided by a normal value of one horizontal period, is divided into a plurality of pieces and inserted periodically such that the number of fraction adjustment periods included in the charge accumulation periods is equal for each row. The insertion of a plurality of fraction adjustment periods results in a reduction in a difference in length between the fraction adjustment period and the normal period. As a result, high equality across rows in terms of the charge accumulation period can be achieved. In FIGS. 1A and 1B, it is assumed by way of example that the charge accumulation period is set to be equal to four horizontal periods by the focal plane electronic shutter.

In FIG. 1A, the comparative example 101 is provided for ease of understanding the effects of the present embodiment. In this comparative example 101, only one fraction adjustment horizontal period is inserted. In the case of the focal plane electronic shutter, the charge accumulation period in each row is defined in units of horizontal periods. Therefore, the charge accumulation period in each row is equal to either a time Ta given by the sum of four normal horizontal periods or a time Tb given by the sum of three normal horizontal periods and one fraction adjustment horizontal period. In this case, there is a great difference between the fraction adjustment period and the normal period, and the difference in the charge accumulation period from one row to another can be as great as the difference caused by the fraction adjustment period.

In another comparative example 101 shown in FIG. 1B, three fraction adjustment horizontal periods are inserted in a second-half of a vertical period. Therefore, the difference between the normal period and the fraction adjustment period is as small as ⅓ of the difference in the comparative example 101 shown in FIG. 1A. However, the charge accumulation period varies across rows within a range from a time Ta equal to the sum of four normal horizontal periods to a time Te equal to the sum of one normal horizontal period and three fraction adjustment horizontal periods. Therefore, the difference between Te and Ta is equal to a remainder that occurs when one vertical period is divided by the normal horizontal period, and no reduction in the row-to-row difference in the charge accumulation period is achieved.

On the other hand, in the present embodiment 102 shown in FIGS. 1A and 1B, a fraction adjustment horizontal period is inserted every three horizontal periods and thus there are a total of three fraction adjustment horizontal periods in one vertical period. Therefore, the charge accumulation period in each row is equal to either a time Tc defined by the sum of three normal horizontal periods and one fraction adjustment horizontal period or a time Td defined by the sum of two normal horizontal periods and two fraction adjustment horizontal periods. In the present embodiment, as a result of the insertion of three fraction adjustment horizontal periods, the difference between the normal period and the fraction adjustment period is reduced to ⅓ of that in the comparative example 101 shown in FIGS. 1A and 1B. Thus, the row-to-row difference in the charge accumulation period is reduced to ⅓.

FIG. 2 illustrates an example of a configuration of a solid-state image pickup apparatus according to the first embodiment of the present invention. In FIG. 2, a pixel array 201 includes pixels each including a photoelectric conversion element for converting input light into a charge arranged in a two-dimensional array. A readout scanning circuit 203 and a reset scanning circuit 204 operates as a vertical scanning circuit to select a row extending in a horizontal direction in the pixel array 201. A signal charge accumulated in each pixel in the row selected by the readout scanning circuit 203 is read row by row by a reading circuit 206. Hereinafter, the sequence of operations of sequentially scanning rows of the pixel array 201 by the readout scanning circuit 203 and reading the signal charges accumulated in the pixel by the reading circuit 206 will be referred to as a readout scanning operation. A signal read by the reading circuit 206 will be referred to as a pixel signal.

On the other hand, the operation performed by reset scanning circuit 204 to sequentially scanning particular rows in a particular area of the pixel array 201 and reset electric signals accumulated in pixels to a predetermined potential will be referred to as a reset scanning operation. The particular area is set such that the readout scanning circuit 203 or the reset scanning circuit 204 reads the signal from the timing generator circuit 202, and all or some rows in the pixel array 201 are read or reset. The charge accumulation period in which an electric charge is accumulated in one of pixels is controlled by a period from the reset scanning operation to the readout scanning operation (focal plane electronic shutter).

A horizontal scanning circuit 205 is a scanning circuit for selecting a column of the pixel array 201. The pixel signal read row by row by the reading circuit 206 is sequentially output column by column selected by the horizontal scanning circuit 205. The pixel signal output from the reading circuit 206 is converted by an analog-digital (AD) converter 207 from an analog form into a digital form. An image processing unit 208 performs various kinds of image processing including a defect correction, a noise removal, etc. on the pixel signal converted into the digital form.

A vertical scanning signal for driving the readout scanning circuit 203 and the reset scanning circuit 204 and a horizontal scanning signal for driving the horizontal scanning circuit 205 are generated by a timing generator circuit 202. The timing generator circuit 202 generates the vertical scanning signal and the horizontal scanning signal in synchronization with a vertical synchronization signal and a horizontal synchronization signal output from a synchronization signal generation unit 200. Thus, the timing associated with the reset scanning operation and the readout scanning operation to control the focal plane electronic shutter is determined by the vertical synchronization signal and the horizontal synchronization signal output from the synchronization signal generation unit 200.

When a frame rate at which an image is captured is equal to 60 fps, one vertical period defined by an interval of the vertical synchronization signals is about 16.7 ms. If a horizontal period defined by an interval of the horizontal synchronization signals is 10 μs, a remainder of 6.7 μs occurs. To achieve the constant frame rate, a row with a different horizontal period is inserted. Such a row is referred to as a fraction adjustment period.

In the present embodiment, the remainder that occurs when one vertical period is divided by one normal horizontal period is divided into a plurality of pieces, i.e., a plurality of fraction adjustment periods, and the fraction adjustment periods are inserted periodically whereby high equality across rows in terms of the number of fraction adjustment periods included in the charge accumulation period is achieved.

Figure 3A:
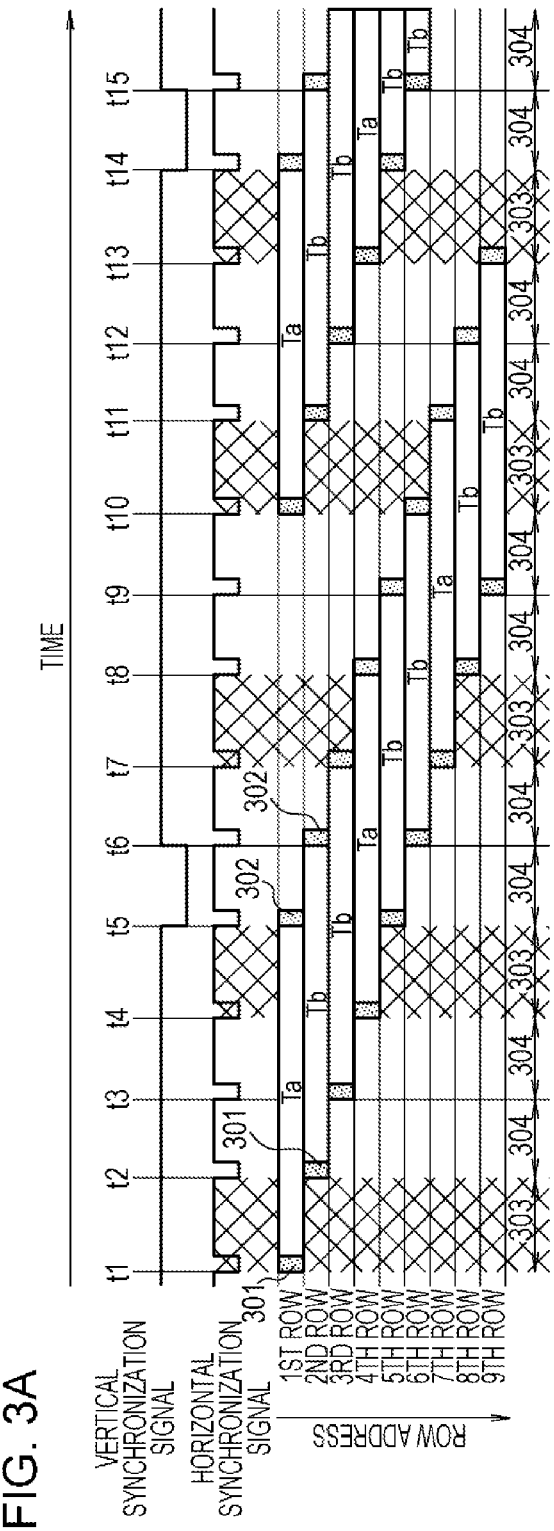
FIGS. 3A and 3B are conceptual diagrams illustrating a relationship between an insertion position of a fraction adjustment period and a charge accumulation period.
Figure 3B:
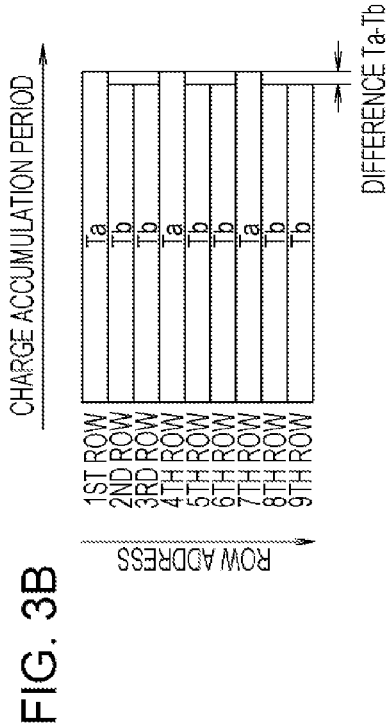

FIGS. 3A and 3B are conceptual diagrams illustrating relationships between the insertion positions of fraction adjustment periods and the charge accumulation period in each row according to the first embodiment of the present invention. In FIGS. 3A and 3B, it is assumed by way of example that the charge accumulation period is equal to four horizontal periods. In the example shown in FIGS. 3A and 3B, the focal plane electronic shutter operation is performed such that the reset scanning operation is started at time t1, and the readout scanning operation is started at time t5. The charge accumulation period Ta in the first row is given by a time from time t1 at which the resetting operation 301 is performed to time t5 at which the reading operation 302 is performed. The charge accumulation period Ta includes four horizontal periods two of which are fraction adjustment horizontal periods 303 and the other two of which are normal horizontal periods 304. On the other hand, the charge accumulation period Tb in the second row is given by a period from time t2 at which the resetting operation 301 is performed to time t6 at which the reading operation 302. The charge accumulation period Tb includes four horizontal periods one of which is a fraction adjustment horizontal period 303 and three of which are normal horizontal periods 304. In the third and following rows, the charge accumulation period is given in a similar manner. Thus, the charge accumulation period in any of the first to ninth rows is equal to either Ta or Tb, and more specifically, the charge accumulation periods from the first to ninth rows are respectively Ta, Tb, Tb, Ta, Tb, Tb, Ta, Tb, and Tb. The difference in charge accumulation period, i.e., Ta−Tb, is equal to the difference between the fraction adjustment period 303 and the normal period 304.

In the present embodiment, three fraction adjustment horizontal periods are inserted in one vertical period, and thus the difference between the fraction adjustment period and the normal period is reduced to ⅓ of that in the case where only one fraction adjustment horizontal period is inserted. Thus, the stepwise difference in pixel signal due to the difference in charge accumulation period across rows is reduced to ⅓. Furthermore, because fraction adjustment periods are dispersively inserted in periodic positions, rows having different charge accumulation periods (rows having a charge accumulation period of Ta and rows having a charge accumulation period of Tb) are dispersed, and thus stepwise differences in pixel signal become visually less noticeable.

Next, a specific method of dispersively inserting fraction adjustment periods in periodic positions is described. FIGS. 4A and 4B are schematic diagrams illustrating relationships among a count of a vertical counter, a count of a horizontal counter, the vertical synchronization signal, and the horizontal synchronization signal according to the first embodiment of the invention. Note that the schematic diagrams shown in FIGS. 4A and 4B illustrate an internal process performed by the synchronization signal generation unit 200 shown in FIG. 2.

In the present embodiment, one fraction adjustment period with a different horizontal count is inserted every three horizontal periods. FIG. 4A illustrates a case in which the fraction adjustment period 303 is longer than the normal period 304 (Nh2>Nh1). FIG. 4B illustrates a case in which the fraction adjustment period 303 is shorter than the normal period 304 (Nh2<Nh1). When the vertical count CntV of the vertical counter and the cycle count CntC of the cycle counter are equal to 0, the horizontal count CntH of the horizontal counter counts from 0 to the horizontal count Nh1 (normal period 304). Hereinafter, the vertical count CntV of the vertical counter will be referred to as the count CntV, the cycle count CntC of the cycle counter will be referred to as the count CntC, and the horizontal count CntH of the horizontal counter will be referred to as the count CntH.

When the count CntH reaches the horizontal count value Nh1, the count CntC and the count CntV are incremented by 1 and thus they become equal to 1, and the count CntH counts from 0 to the horizontal count value Nh1 (normal period 304).

The count CntH reaches Nh1, the count CntC and the count CntV are incremented by 1 and thus they become equal to 2. When the count CntC is equal to 2, the count CntH counts from 0 to the horizontal count Nh2 that is different from the normal value (fraction adjustment period 303).

When the count CntH reaches Nh2, the count CntC is initialized to 0, and the count CntV is incremented by 1 and thus the count CntV becomes equal to 3. The count CntH counts from 0 to the horizontal count value Nh1 (normal period 304).

Thereafter, the operation is performed repeatedly in a similar manner until the count CntV reaches the vertical row count value 11. If the count CntV reaches 11, the count CntC reaches 2, and the count CntH reaches Nh2, the counts CntV, CntC, and CntH are initialized to 0. In the present example, the one vertical period includes 12 horizontal periods corresponding to the count CntV of 0 to 11.

The fraction adjustment periods 303 are provided to adjust the length of one vertical period. The threshold value Nh1 of the count CntH indicates the length of the normal period 304 and is determined by the sum of the number of effective horizontal pixels, the number of horizontal OB (optically black) pixels, and the number of horizontal blanking intervals. On the other hand, the threshold value Nh2 of the count CntH indicates the length of the fraction adjustment period 303, and the threshold value Nh2 is determined to adjust the length of one vertical period.

Thus, in the present embodiment, four fraction adjustment horizontal periods 303 are inserted in one vertical period, and the length of one vertical period is adjusted by changing the threshold value Nh2 of the count CntH which indicates the length of the fraction adjustment period 303. In synchronization with the timing of initializing the count CntH to 0, the horizontal synchronization signal is asserted. Furthermore, in synchronization with the timing of initializing the count CntV to 0, the vertical synchronization signal is asserted. As described above, by using the count CntH, the count CntV, and the count CntC, fraction adjustment periods 303 can be inserted at desired cycles in one vertical period such that the fraction adjustment periods 303 are located at periodical positions.

Figure 5:
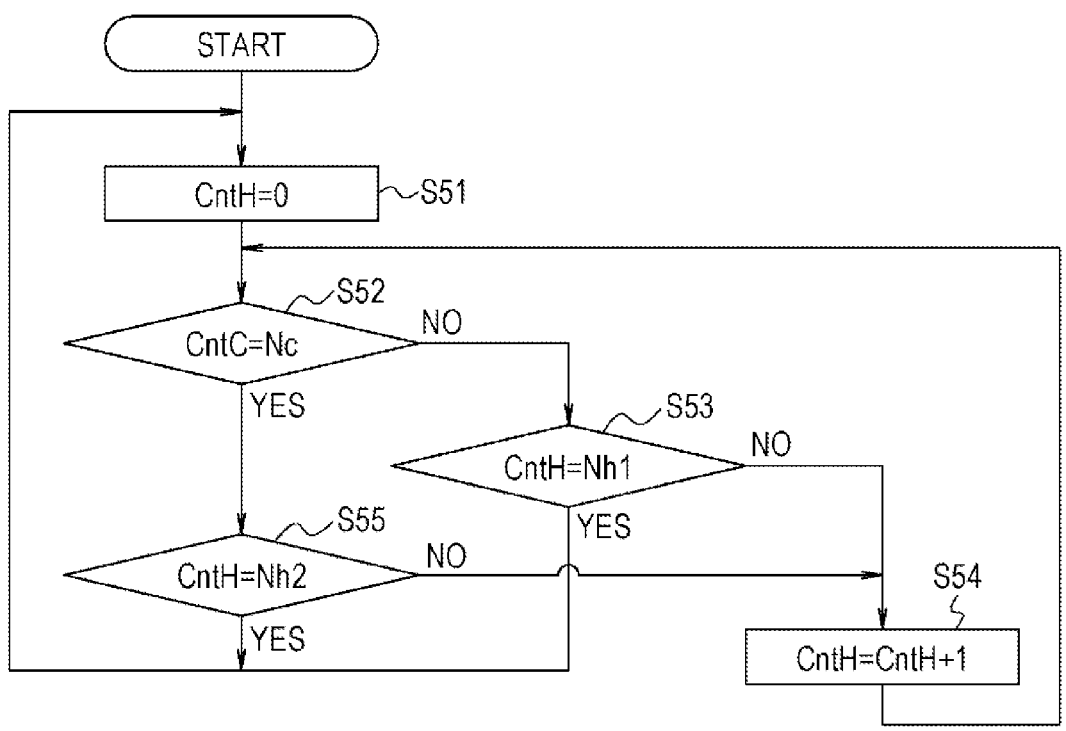
FIG. 5 is a flow chart illustrating an operation of a horizontal counter.

Next, the operation of each of the count CntH, the count CntV, and the count CntC is described in further detail below with reference to a flow chart. FIG. 5 is a flow chart illustrating an operation of a horizontal count CntH, which is a horizontal counter according to the first embodiment of the present invention. When an image capturing operation starts, the horizontal counter initializes a count CntH to 0 (step S51). Subsequently, the horizontal counter determines whether a cycle count CntC is equal to Nc (step S52). Note that Nc is a threshold value that determines the cycle, in units of horizontal periods, of occurrence of the fraction adjustment period. For example, in the embodiment described above with reference to FIGS. 4A and 4B, one fraction adjustment horizontal period occurs in every three horizontal periods, and thus Nc=3−1=2. When count CntC is equal to Nc, it is determined to put a fraction adjustment period, while when count CntC is not equal to Nc, it is determined to put a normal period.

First, a processing flow is described for a case where the count CntC is not equal to Nc. If the count CntC is not equal to Nc, the horizontal counter determines that the current period is a normal period, and the horizontal counter determines whether the count CntH is equal to Nh1 (step S53). If the count CntH is not equal to Nh1, the horizontal counter increments the count CntH (step S54) and returns to step S52. If the count CntH is equal to Nh1, the horizontal counter returns to step S51 and initializes the count CntH to 0.

Next, a processing flow is described below for a case where the count CntC is equal to Nc. When the count CntC is equal to Nc, the horizontal counter determines that the current period is a fraction adjustment period, and the horizontal counter determines whether the count CntH is equal to Nh2 (step S55). When the count CntH is not equal to Nh2, the horizontal counter increments the count CntH (step S54) and returns to step S52. If the count CntH is equal to Nh2, the horizontal counter returns to step S51 and initializes the count CntH to 0.

Figure 6:
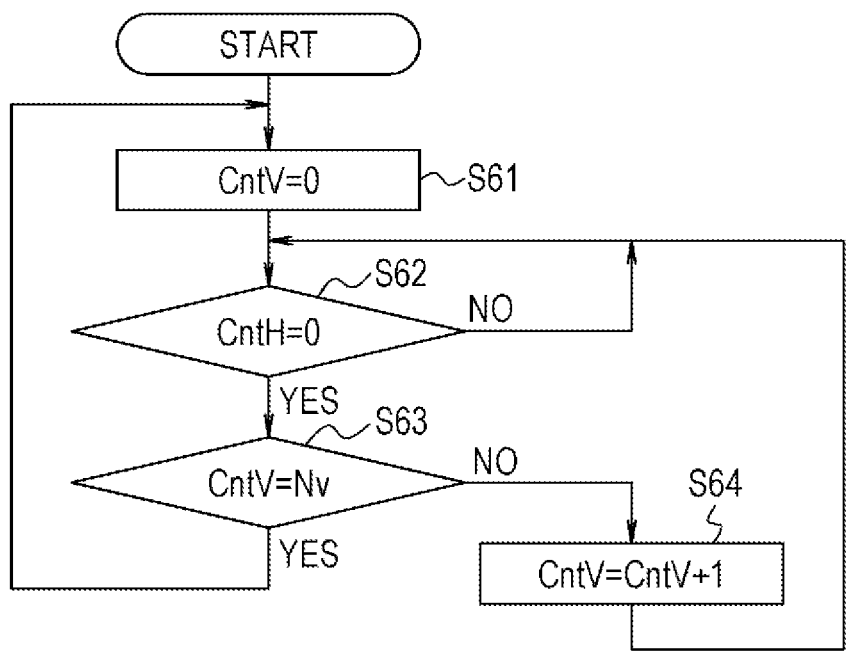
FIG. 6 is a flow chart illustrating an operation of a vertical counter.

FIG. 6 is a flow chart illustrating an operation of the vertical count CntV, which is a vertical counter according to the first embodiment of the present invention. When an image capturing operation starts, the vertical counter initializes the count CntV to 0 (step S61). Subsequently, the vertical counter determines whether the count CntH is equal to 0 (step S62). When the count CntH is not equal to 0, the process returns to step S62, and thus count CntV is held until the count CntH becomes equal to 0. When the count CntH is equal to 0, the vertical counter determines whether the count CntV is equal to Nv (step S63). Nv is a threshold value indicating the number of horizontal periods that should be included in one vertical period. For example, in the embodiment shown in FIGS. 4A and 4B, one vertical period includes 12 horizontal periods, and thus Nv=12−1=11. If the count CntV is not equal to Nv, the vertical counter increments the count CntV (step S64) and returns to step S62. If the count CntV is equal to Nv, this means that the end of one vertical period is reached, and thus the vertical counter returns to step S61 and initializes the count CntV to 0.

Figure 7:
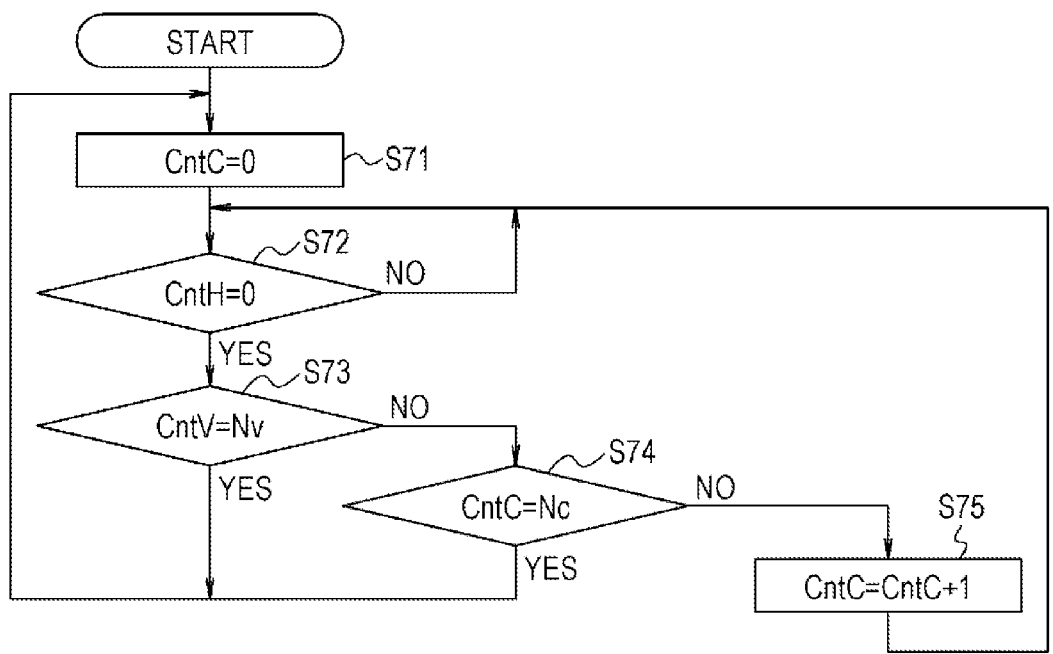
FIG. 7 is a flow chart illustrating an operation of a vertical counter.

FIG. 7 is a flow chart illustrating an operation of the cycle count CntC, which is the cycle counter according to the first embodiment of the present invention. When an image capturing operation starts, the vertical counter initializes the count CntC to 0 (step S71). Subsequently, the vertical counter determines whether the count CntH is equal to 0 (step S72). When the count CntH is not equal to 0, the process returns to step S72, and thus count CntC is held until the count CntH becomes equal to 0. When the count CntH is equal to 0, the vertical counter determines whether the count CntV is equal to Nv (step S73). If the count CntV is equal to Nv, this means that the end of one vertical period is reached, and thus the vertical counter returns to step S71 and initializes the count CntC to 0. If the count CntV is not equal to Nv, the vertical counter determines whether the count CntC is equal to Nc (step S74). If the count CntC is not equal to Nc, the vertical counter increments the count CntC (step S75) and returns to step S71. If the count CntC is equal to Nc, this means that the last cycle of insertion of the fraction adjustment period is reached, and thus vertical counter returns to step S71 and initializes the count CntC to 0.

In the embodiment described above, it is assumed that the count CntH, the count CntV, and the count CntC are up-counters. Alternatively, to achieve the effects of the present embodiment, down-counters or gray-code counters may be used.

In the embodiments described above, for simplicity of illustration, it is assumed that one vertical period includes 9 to 12 horizontal periods. Note that the number of horizontal periods is not limited to this range. For example, in the case of an image pickup apparatus including 1920 pixels in the horizontal direction and 1080 pixels in the vertical direction, one vertical period includes 1080 horizontal periods. If one fraction adjustment period having a different horizontal count is inserted every three horizontal periods as in the present embodiment, there are 360 fraction adjustment periods. Therefore, the present embodiment makes it possible to reduce the difference in length between the normal period and the fraction adjustment period to 1/360 of a difference obtained in a case where a fraction adjustment period is inserted in one horizontal period. Therefore, the stepwise difference in pixel signal due to the difference in charge accumulation period among rows becomes 1/360. That is, in the present embodiment, the greater the number of horizontal periods included in one vertical period, the greater the reduction is achieved in the stepwise difference in pixel signal due to the row-to-row difference in the charge accumulation period.

If the difference in length between the fraction adjustment period and the normal period, i.e., |Nh2−Nh1|, is set to be equal to the least possible value of the count CntH (for example, a clock frequency according to which the count CntH is counted), it is possible to further reduce the stepwise difference in pixel signal due to the difference in charge accumulation period among rows.

As described above, the synchronization signal generation unit 200 generates the horizontal synchronization signal and the vertical synchronization signal. The horizontal synchronization signal has a pulse interval defining the normal period (first horizontal period) 304 and a pulse interval defining the fraction adjustment period (second horizontal period) 303 having a different length from that of the normal period 304. Based on the horizontal synchronization signal, the reset scanning circuit 204 sequentially selects pixels in a row of the pixel array 201 and resets electric charges accumulated in photoelectric conversion elements. Based on the horizontal synchronization signal, the readout scanning circuit 203 sequentially selects pixels in a row of the pixel array 201 to be read, and the readout scanning circuit 203 reads the pixel signal from the selected pixels. Each pixel accumulates a signal charge during the period from the time at which the pixel is reset by the reset scanning circuit 204 to the time at which the pixel signal is read by the readout scanning circuit 203. As shown in FIGS. 1A and 1B and in FIG. 3, in one vertical period defined by the pulse interval of the vertical synchronization signal, the horizontal synchronization signal is generated such that the normal period (first horizontal period) 304 and also the fraction adjustment period (second horizontal period) 303 appear a plurality of times. The fraction adjustment period (second horizontal period) 303 appears periodically.

In one vertical period, as shown in FIGS. 4A and 4B, the number (for example 12) of horizontal periods defined by the pulse interval of the horizontal synchronization signal is a multiple of a cycle (for example 3 periods) of occurrence of the fraction adjustment period (second horizontal period) 303. In the charge accumulation period, the horizontal synchronization signal is generated such that both the normal period (first horizontal period) 304 and the fraction adjustment period (second horizontal period) 303 appear.

The synchronization signal generation unit 200 includes the vertical counter, the cycle counter, and the horizontal counter. As shown in FIG. 6, to set the length of one vertical period, the vertical counter counts the number of horizontal periods CntV, which appear at pulse intervals of the horizontal synchronization signal. As shown in FIG. 7, to set the length of the horizontal period to be equal to the normal period (first horizontal period) 304 or the fraction adjustment period (second horizontal period) 303, the cycle counter periodically counts the number of horizontal periods CntC. As shown in FIG. 5, to set the length of the horizontal period to the normal period (first horizontal period) 304 or the fraction adjustment period (second horizontal period) 303, the horizontal counter counts the length of the horizontal period CntH. As shown in FIGS. 4A and 4B, the cycle count CntC of the cycle counter is initialized to 0 in synchronization with the timing of initializing the vertical count CntV of the vertical counter to 0.

According to the present embodiment, the focal plane electronic shutter can be controlled such that high equality of the charge accumulation period across rows is achieved. As a result, it is possible to reduce the difference in pixel signal level due to the difference in charge accumulation period across rows, and thus an improvement in image quality can be achieved.

Second Embodiment

A second embodiment of the present invention is described below while focusing on differences from the first embodiment. The second embodiment is different from the first embodiment in the operation of the cycle count CntC of the cycle counter. This embodiment provides an advantage that high equality across rows in terms of the charge accumulation period can be achieved even if the number of horizontal periods included in one vertical period is not equal to a multiple of the cycle of insertion of fraction adjustment periods.

Figure 8A:
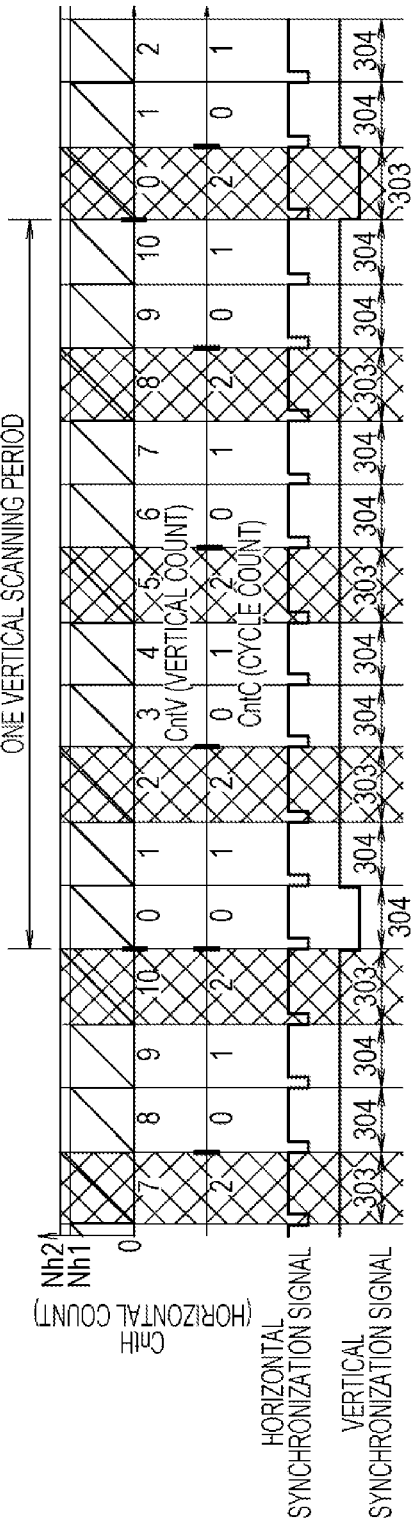
FIGS. 8A and 8B are schematic diagrams illustrating relationships among a count, a vertical synchronization signal, and a horizontal synchronization signal.
Figure 8B:
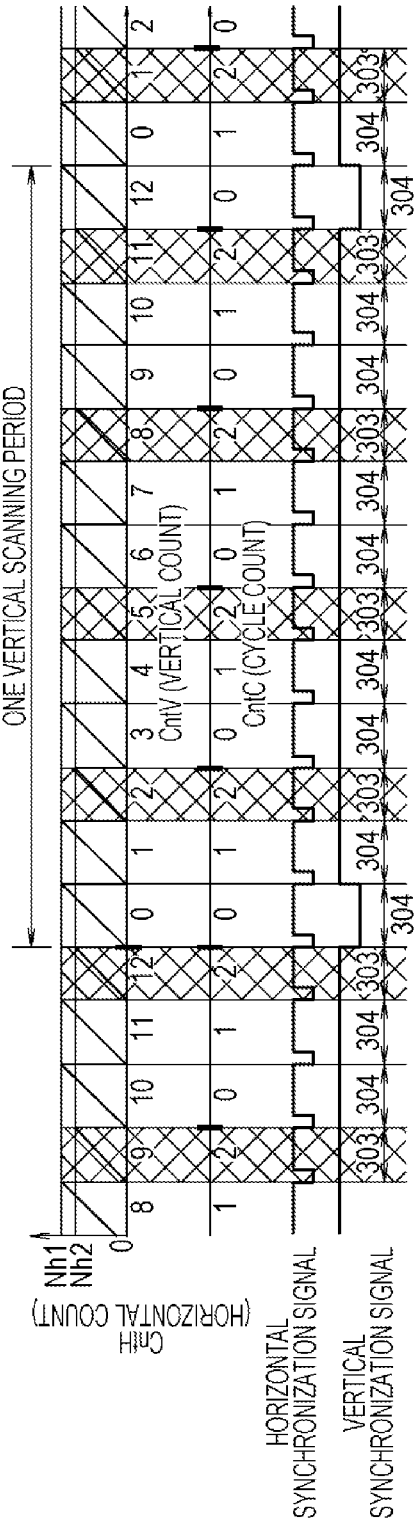

FIGS. 8A and 8B are schematic diagrams illustrating relationships among a count of a vertical counter, a count of a horizontal counter, the vertical synchronization signal, and the horizontal synchronization signal according to the second embodiment of the present invention. Note that the schematic diagrams shown in FIGS. 8A and 8B illustrate an internal process performed by the synchronization signal generation unit 200 shown in FIG. 2. In the present embodiment, one fraction adjustment period with a different horizontal count is inserted every three horizontal periods. FIG. 8A illustrates a case in which the fraction adjustment period 303 is longer than the normal period 304 (Nh2>Nh1). FIG. 8B illustrates a case in which the fraction adjustment period 303 is shorter than the normal period 304 (Nh2<Nh1). In the present embodiment, unlike the previous embodiment, the count CntC is not initialized to 0 when the count CntV reaches 10, which is the value indicating the one vertical period. Because the count CntC is not initialized to 0, the intervals at which the fraction adjustment period is inserted extend over vertical periods. The cycle count CntC of the cycle counter is not initialized when the vertical count CntV of the vertical counter is initialized to 0.

Figure 9:
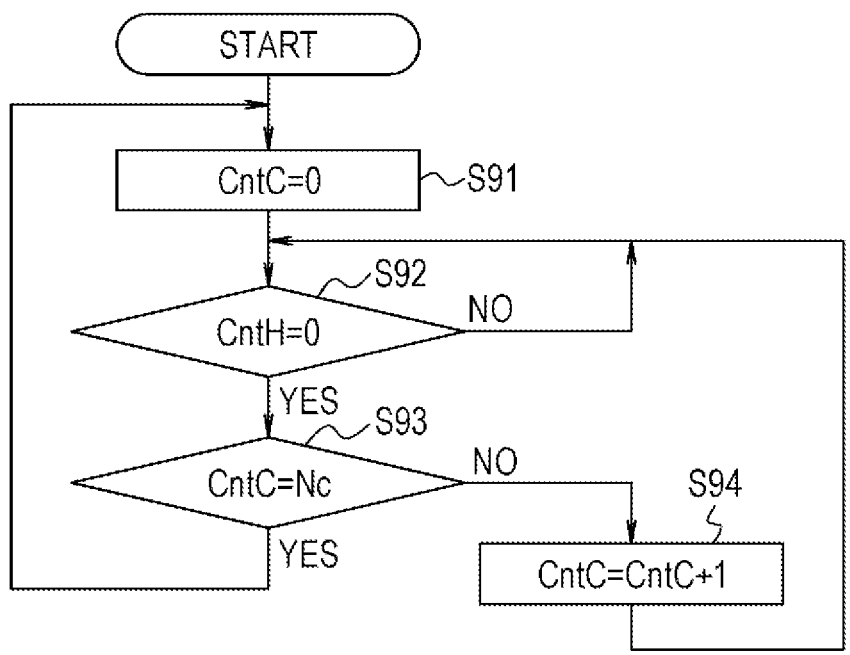
FIG. 9 is a flow chart illustrating an operation of a vertical counter.

FIG. 9 is a flow chart illustrating an operation of the cycle counter in terms of the cycle count CntC according to the second embodiment of the present invention. When an image capturing operation starts, the vertical counter initializes the count CntC to 0 (step S91). Subsequently, the vertical counter determines whether the count CntH is equal to 0 (step S92). When the count CntH is not equal to 0, the process returns to step S92, and thus count CntC is held until the count CntH becomes equal to 0. When the count CntH is equal to 0, the vertical counter determines whether the count CntV is equal to Nv (step S93). If the count CntC is not equal to Nc, the vertical counter increments the count CntC (step S94) and returns to step S91. If the count CntC is equal to Nc, this means that the last cycle of insertion of the fraction adjustment period is reached, and thus vertical counter returns to step S91 and initializes the count CntC to 0.

As described above, the present embodiment provides the advantage that high equality across rows in terms of the charge accumulation period can be achieved even if the number of horizontal periods included in one vertical period is not equal to a multiple of the cycle of insertion of fraction adjustment periods. Thus, the present embodiment makes it possible to reduce the stepwise difference in pixel signal due to the row-to-row difference in the charge accumulation period.

Third Embodiment

A third embodiment of the present invention is described below while focusing on differences from the first embodiment. In this embodiment, high equality of the charge accumulation period across rows can be achieved by controlling the number of horizontal periods included in one vertical period, the cycle of insertion of the fraction adjustment period, and the charge accumulation period.

Figure 10A:
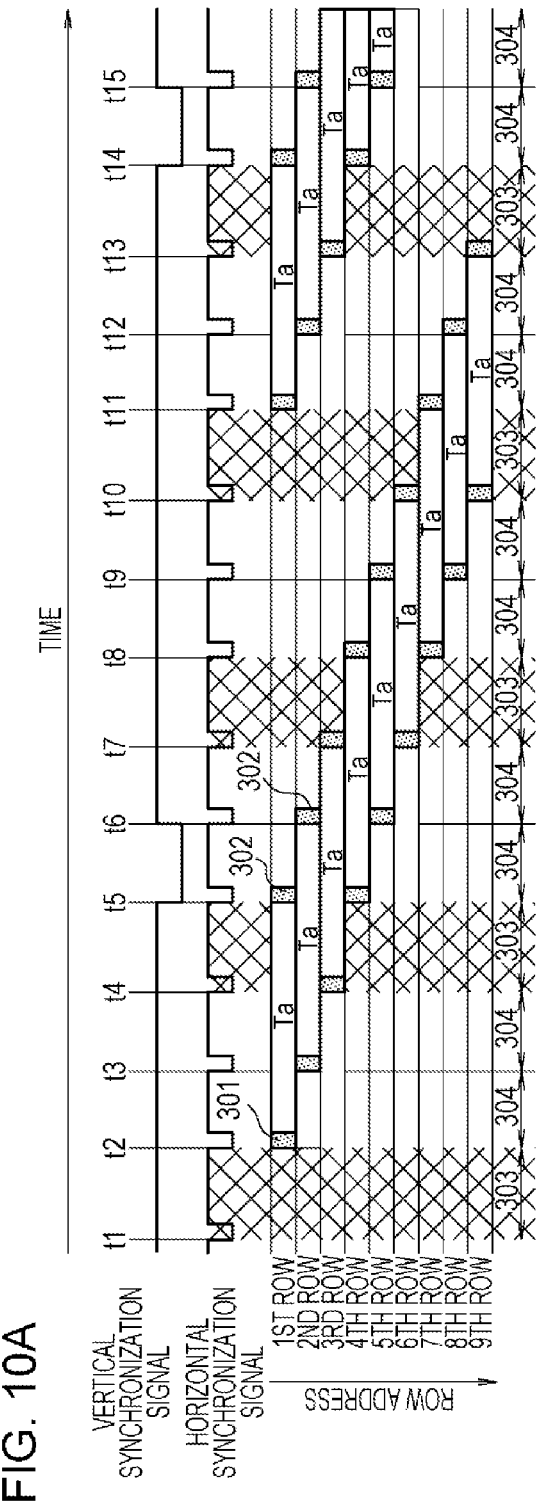
FIGS. 10A and 10B are conceptual diagrams illustrating a relationship between an insertion position of a fraction adjustment period and a charge accumulation period.
Figure 10B:
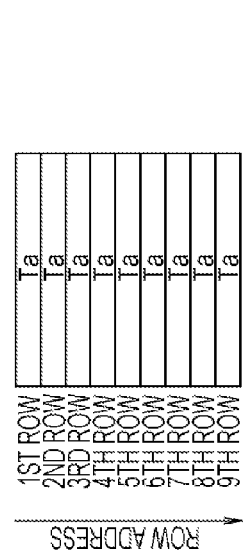

FIGS. 10A and 10B are conceptual diagrams illustrating relationships between the insertion positions of fraction adjustment periods and the charge accumulation period in each row according to the third embodiment of the present invention. In FIGS. 10A and 10B, it is assumed by way of example that the charge accumulation period is equal to three horizontal periods. In the present embodiment, the reset scanning operation is started at time t2 and the readout scanning operation is started at time t5 whereby the focal plane electronic shutter operation is performed. The charge accumulation period Ta in the first row is given by a time from time t2 at which the resetting operation 301 is performed to time t5 at which the reading operation 302 is performed. The charge accumulation period Ta includes three horizontal periods one of which is a fraction adjustment period 303 and two of which are normal periods 304. This also applies to all charge accumulation periods from the second to ninth rows.

In the present embodiment, it is possible to achieve high equality in terms of the charge accumulation period across rows by determining the following parameters, i.e., the number Nv0 of horizontal periods included in one vertical period, the cycle Nc0 of occurrence of fraction adjustment period, and the number Na0 of horizontal periods defining the charge accumulation period such that the following condition is satisfied.

$Nv0 = M \times Nc0$ ($M$ is a positive integer equal to or greater than 2)

$Na0 = K \times Nc0$ ($K$ is a positive integer)

The number Na0 of horizontal periods defining the charge accumulation period is a multiple of the cycle Nc0 of occurrence the fraction adjustment period (second horizontal period) 303. Thus, in the present embodiment, the charge accumulation period can be equal across rows even in the case where a fraction adjustment period is inserted to adjust the length of one vertical period. Thus, the present embodiment makes it possible to eliminate the stepwise difference in pixel signal due to the row-to-row difference in the charge accumulation period.

Fourth Embodiment

A fourth embodiment of the present invention is described below while focusing on differences from the first embodiment. The present embodiment is different in that the number of fraction adjustment periods inserted periodically is controlled using a fraction row counter configured to count the number of fraction adjustment periods. In the present embodiment, it is possible to adjust the length of one vertical period with high accuracy by controlling the number of fraction adjustment periods inserted periodically.

Figure 11A:
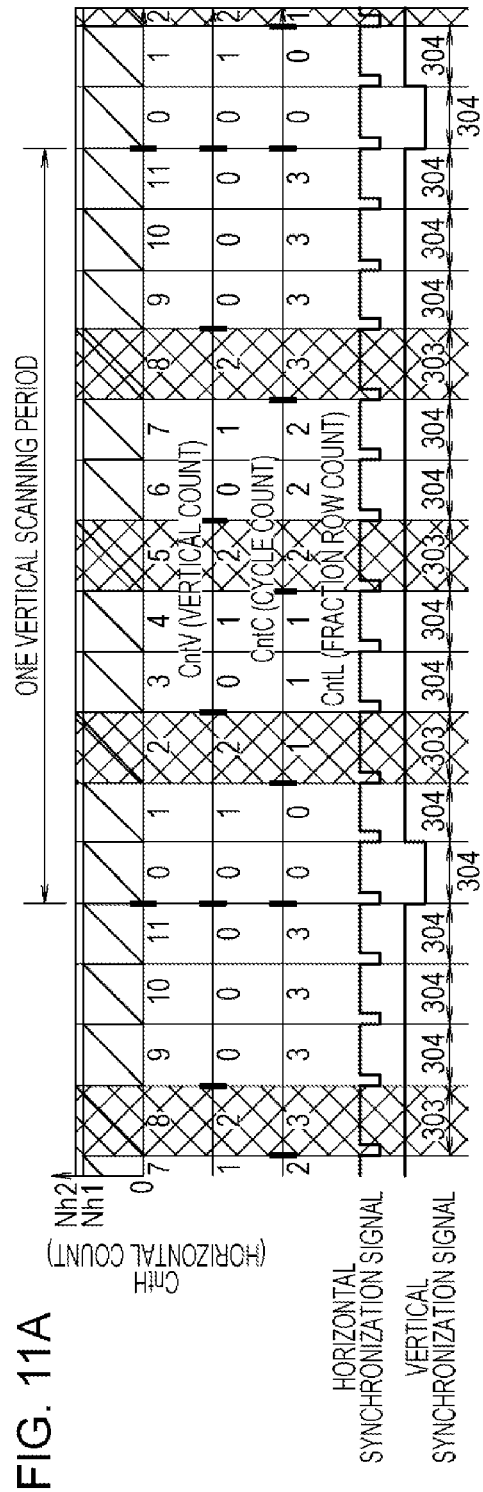
FIGS. 11A and 11B are schematic diagrams illustrating relationships among a count, a vertical synchronization signal, and a horizontal synchronization signal.
Figure 11B:
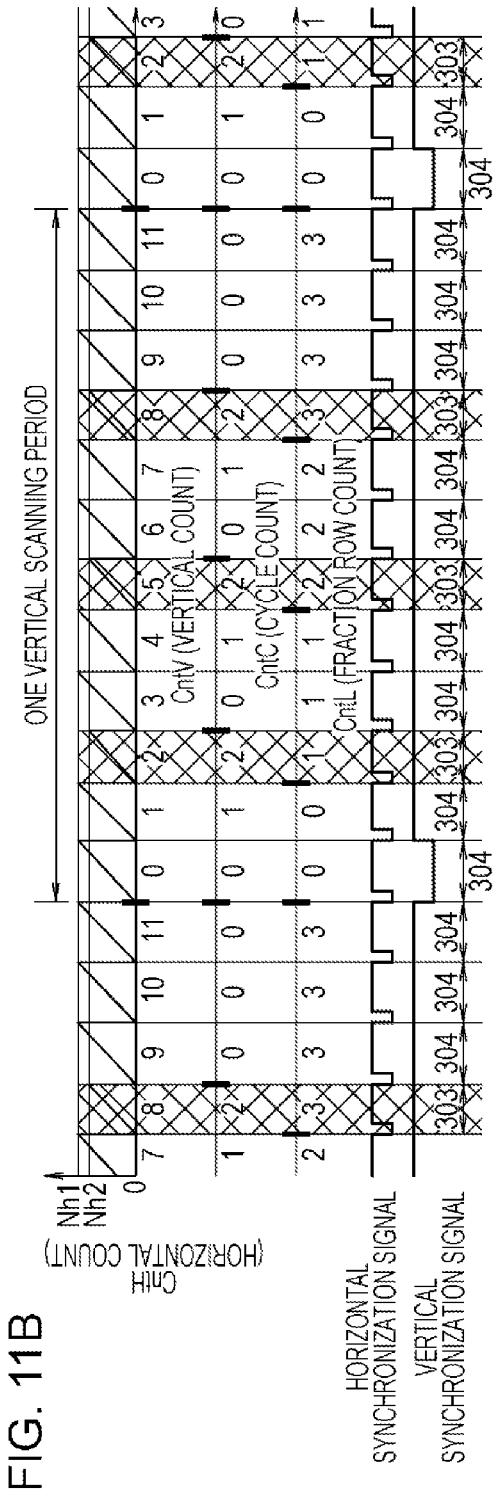

FIGS. 11A and 11B are schematic diagrams illustrating relationships among a count of a vertical counter, a count of a horizontal counter, the vertical synchronization signal, and the horizontal synchronization signal according to the fourth embodiment of the present invention. Note that the schematic diagrams shown in FIGS. 11A and 11B illustrate an internal process performed by the synchronization signal generation unit 200 shown in FIG. 2. In the present embodiment, one fraction adjustment period with a different horizontal count is inserted every three horizontal periods. FIG. 11A illustrates a case in which the fraction adjustment period 303 is longer than the normal period 304 (Nh2>Nh1). FIG. 11B illustrates a case in which the fraction adjustment period 303 is shorter than the normal period 304 (Nh2<Nh1).

The present embodiment is different in that a fraction row count CntL of the fraction row counter (hereinafter, referred to as a count CntL) is additionally provided thereby to control the operation of the cycle count CntC. The count CntL is initialized to 0 in synchronization with the timing of initializing the count CntV to 0. The count CntL is incremented when the count CntC reaches 2. When the count CntC is equal to 2, the count CntH counts from 0 to the horizontal count Nh2 that is different from the normal value (fraction adjustment period 303). Thus, the count CntL operates to count the number of fraction adjustment periods 303. This counting operation is repeated until the count CntL reaches 3. When the count CntL reaches 3, the count CntL is held at 3 until the count CntV is initialized to 0. When the count CntL is in the state in which the count CntL is held at 3, the count CntC is not incremented and is held at 0. By performing the counting operation in the above-described manner, it becomes possible to control the insertion of fraction adjustment periods such that no fraction adjustment period is inserted after three fraction adjustment horizontal periods are inserted, as shown in FIGS. 11(A) and (B).

The value held by the count CntL is determined to achieve a high-precision adjustment of the length of one vertical period. For example, if the difference in length between the fraction adjustment period and the normal period, i.e., |Nh2−Nh1|, is set to be equal to the least countable value of the count CntH (for example, the clock cycle used in counting by the count CntH), it becomes possible to adjust the length of one vertical period in units corresponding to the least countable value of the count CntH.

As described above, by using the count CntH, the count CntV, the count CntC, and the count CntL, fraction adjustment periods are inserted periodically at a desirable cycle in one vertical period while achieving a high-precision adjustment of the length of one vertical period.

Figure 12:
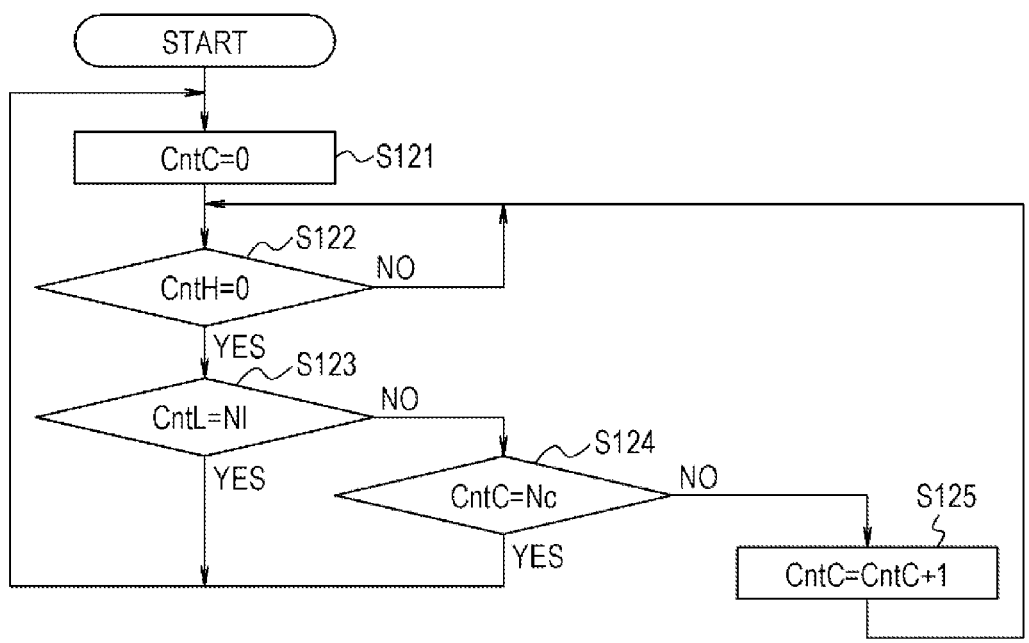
FIG. 12 is a flow chart illustrating an operation of a vertical counter.

Next, the operation of each of the count CntC and the count CntL is described in further detail below with reference to a flow chart. FIG. 12 is a flow chart illustrating an operation of the cycle count CntC, which is the cycle counter according to the fourth embodiment of the present invention. When an image capturing operation starts, the vertical counter initializes the count CntC to 0 (step S121). Subsequently, the vertical counter determines whether the count CntH is equal to 0 (step S122). When the count CntH is not equal to 0, the process returns to step S122, and thus count CntC is held until the count CntH becomes equal to 0. When the count CntH is equal to 0, the vertical counter determines whether the count CntL is equal to N1 (step S123). If the count CntL is equal to N1, this means that the end of one inserted fraction adjustment period is reached, and thus the vertical counter returns to step S121 and initializes the count CntC to 0. If the count CntL is not equal to N1, the vertical counter determines whether the count CntC is equal to Nc (step S124). If the count CntC is not equal to Nc, the vertical counter increments the count CntC (step S125) and returns to step S121. If the count CntC is equal to Nc, this means that the last cycle of insertion of the fraction adjustment period is reached, and thus the vertical counter returns to step S121 and initializes the count CntC to 0.

Figure 13:
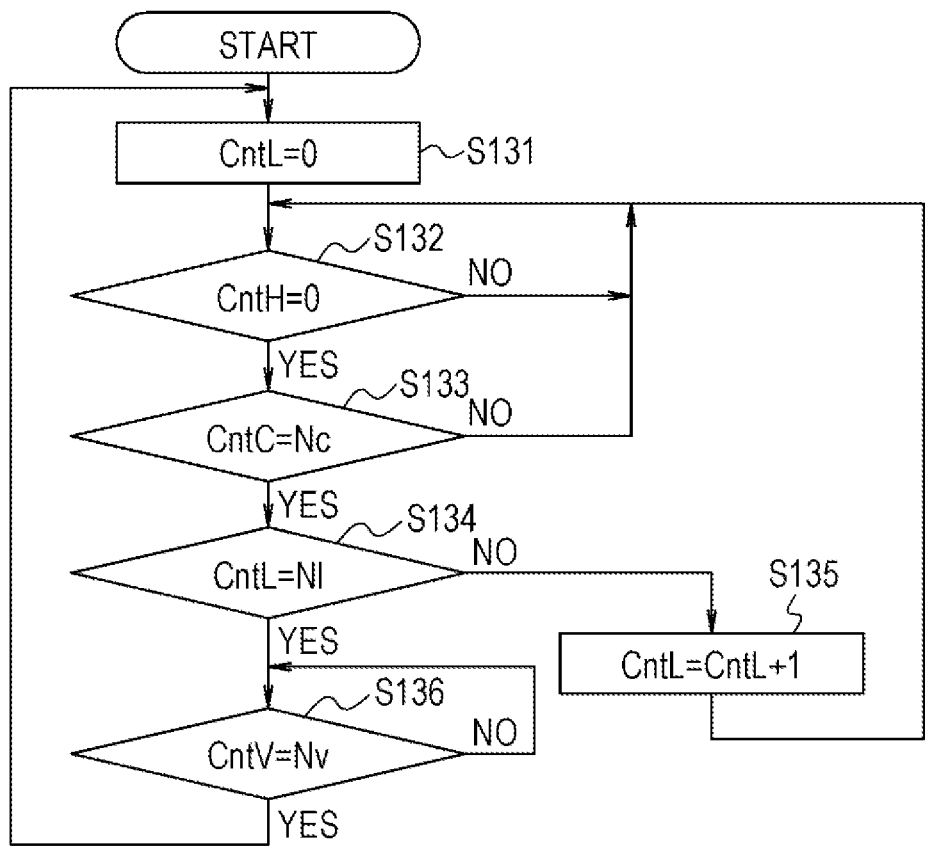
FIG. 13 is a flow chart illustrating an operation of a vertical counter.

FIG. 13 is a flow chart illustrating an operation of the fraction row count CntL, which is the fraction row counter according to the fourth embodiment of the present invention. When an image capturing operation starts, the vertical counter initializes the count CntL to 0 (step S131). Subsequently, the vertical counter determines whether the count CntH is equal to 0 (step S132). When the count CntH is not equal to 0, the process returns to step S132, and thus count CntL is held until the count CntH becomes equal to 0. When the count CntH is equal to 0, the vertical counter determines whether the count CntC is equal to Nc (step S133). When the count CntC is not equal to Nc, the process returns to step S132, and thus count CntL is held until the count CntC becomes equal to Nc. If the count CntC is equal to Nc, the vertical counter determines whether the count CntL is equal to N1 (step S134). If the count CntL is not equal to N1, the vertical counter increments the count CntL (step S135) and returns to step S132. If the count CntL is equal to N1, the vertical counter determines whether the count CntV is equal to Nv (step S136). If the count V is not equal to Nv, this means that the vertical period is in progress, and thus the process returns to step S136, and the count CntL is held at N1. If the count CntV is equal to Nv, this means that the end of one vertical period is reached, and thus the vertical counter returns to step S131 and initializes the count CntL to 0.

The synchronization signal generation unit 200 includes the fraction row counter that counts the number of fraction adjustment periods (second horizontal periods) 303. As shown in FIG. 12, when the count value CntL of the fraction row counter reaches the predetermined value N1, the cycle count CntC of the cycle counter is initialized to 0.

In the present embodiment, as described above, even in the case where fraction adjustment periods are inserted to adjust the length of one vertical period, it is possible to properly control the number of fraction adjustment periods. That is, it is possible to dispersively insert fraction adjustment periods periodically at a desirable cycle in one vertical period while achieving a high-precision adjustment of the length of one vertical period.

Fifth Embodiment

Figure 14:
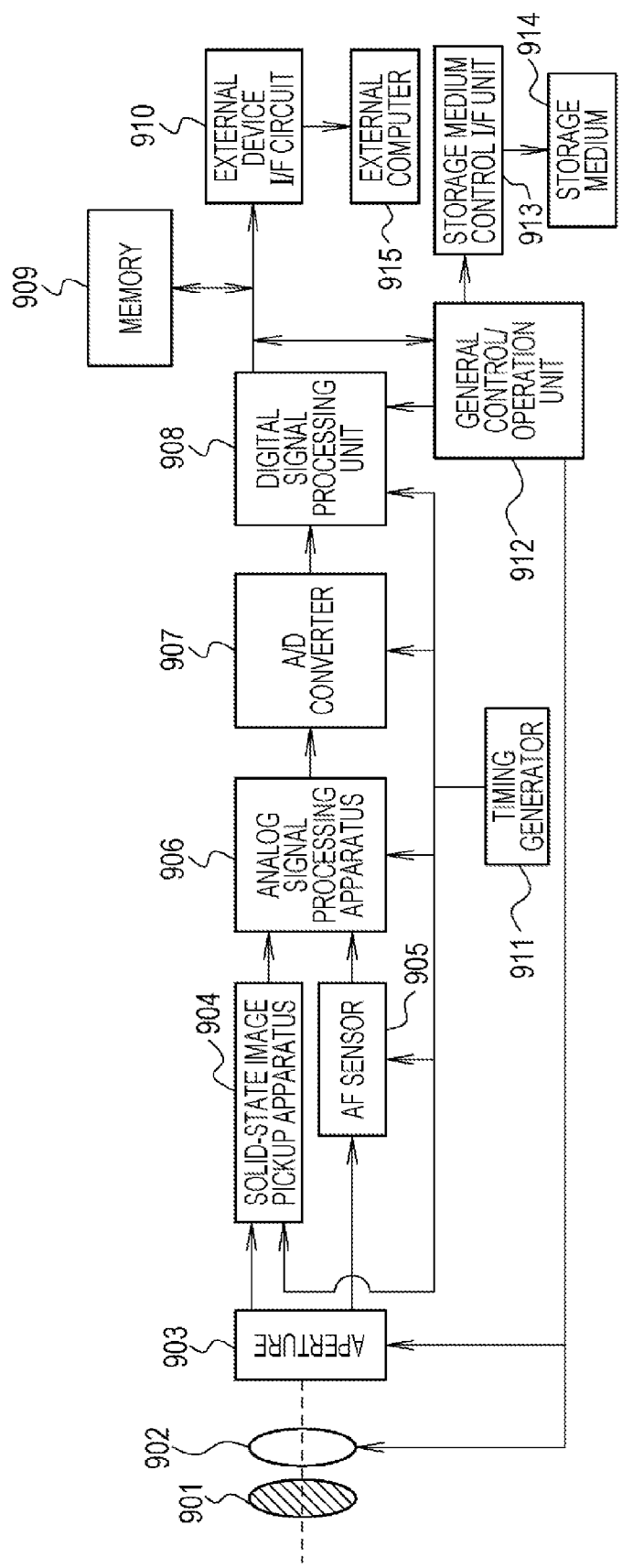
FIG. 14 is a block diagram illustrating an example of a configuration of an image pickup system.

FIG. 14 is a block diagram illustrating an example of a configuration of an image pickup system according to a fifth embodiment of the present invention. 901 denotes a barrier that protects a lens 902 described below. 902 denotes the lens that forms an optical image of an object on a solid-state image pickup apparatus 904. 903 denotes an aperture for adjusting the amount of light passing through the lens 902. 904 denotes the solid-state image pickup apparatus that acquires an image signal corresponding to the optical image of the object formed via the lens 902. The solid-state image pickup apparatus according to one of the first to fourth embodiments is used as the solid-state image pickup apparatus 904. 905 denotes an AF sensor. Reference numeral 906 denotes an analog signal processing apparatus that processes a signal output from the solid-state image pickup apparatus 904 and a signal output from the AF sensor 905. Reference numeral 907 denotes an analog-to-digital converter that converts a signal output from the analog signal processing apparatus 906 from an analog form into a digital form. Reference numeral 908 denotes a digital signal processing unit that performs various kinds of processing on image data output from the analog-to-digital converter 907. The processing may include correction processing, data compression processing, etc. Reference numeral 909 denotes a memory for temporarily storing image data. Reference numeral 910 denotes an external device I/F circuit for interfacing with an external computer or the like. Reference numeral 911 denotes a timing generator that outputs various timing signals to the digital signal processing unit 908 and other units. Reference numeral 912 denotes a general control/operation unit that performs various calculations and controls the whole camera. Reference numeral 913 denotes a storage medium control I/F unit. Reference numeral 914 denotes a removable storage medium such as a semiconductor memory for storing and reading acquired image data. Reference numeral 915 denotes an external computer.

When an image is taken, the image pickup system operates as follows. When the barrier 901 is opened and a signal is output from the AF sensor 905, the general control/operation unit 912 calculates the distance to an object based on the phase difference detection. Subsequently, based on the result of the calculation, the general control/operation unit 912 drives the lens 902 to try to achieve focus. A determination is then made as to whether an in-focus state is achieved. If it is determined that focus is not achieved yet, the lens 902 is again driven until focus is achieved. After focus has been achieved, the solid-state image pickup apparatus 904 starts an electric charge accumulation operation. If the electric charge accumulation operation of the solid-state image pickup apparatus 904 is completed, an image signal is output from the solid-state image pickup apparatus 904 and converted from analog form into digital form by the analog-to-digital converter 907. The resultant digital data is processed by the digital signal processing unit 908 and written in the memory 909 under the control of the general control/operation unit 912. The data stored in the memory 909 is then stored in the storage medium 914 via the storage medium control I/F unit 910 under the control of the general control/operation unit 912. The data stored in the memory 909 may be directly input to the computer 915 or the like via the external device I/F unit 910.

The solid-state image pickup apparatus according to one of the first to fourth embodiments may be used in an electronic camera, a video camera, etc. In the solid-state image pickup apparatus, the focal plane electronic shutter can be controlled such that high equality of the charge accumulation period across rows is achieved. As a result, it is possible to reduce the difference in pixel signal level due to the difference in charge accumulation period across rows, and thus an improvement in image quality can be achieved.

While the present invention has been described with reference to embodiments by way of example but not by limitation. It is to be understood that the invention is not limited to specific embodiments described above. On the contrary, the present invention may be embodied in various manners without departing from the spirit and scope of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-277295 filed Dec. 13, 2010, which is hereby incorporated by reference herein in its entirety.

What is claimed is:

1. A solid-state image pickup apparatus comprising:
    a pixel array in which pixels each including photoelectric conversion element for converting light into a charge are disposed in a matrix;
    a synchronization signal generation unit configured to generate a horizontal synchronization signal including a plurality of pulses and having an interval of the pulses corresponding to a first horizontal period and an interval of the pulses corresponding to a second horizontal period different in length from the first horizontal period;
    a reset scanning circuit configured to, based on the horizontal synchronization signal, sequentially select pixels in rows of the pixel array and reset a charge accumulated in the photoelectric conversion element; and
    a readout scanning circuit configured to, based on the horizontal synchronization signal, read pixels in a row, to be read, of the pixel array,
    wherein in each pixel, the charge is accumulated in a charge accumulation period starting when the resetting is performed by the reset scanning circuit and ending when the pixel signal is read by the readout scanning circuit,
    and wherein a plurality of first horizontal periods and a plurality of second horizontal periods appear in one vertical period defined by an interval of a vertical synchronization signal.

2. The solid-state image pickup apparatus according to claim 1, wherein in one vertical period, one second horizontal period cyclically appears following a plurality of first horizontal periods.

3. The solid-state image pickup apparatus according to claim 1, wherein in the one vertical period, the number of horizontal periods is a multiple of a cycle of occurrence of the second horizontal periods.

4. The solid-state image pickup apparatus according to claim 1, wherein the number of horizontal periods that define the charge accumulation period is a multiple of a cycle of occurrence of the second horizontal periods.

5. The solid-state image pickup apparatus according to claim 1, wherein the horizontal synchronization signal is generated such that both the first horizontal period and the second horizontal period occur in the charge accumulation period.

6. The solid-state image pickup apparatus according to claim 1, wherein the synchronization signal generation unit includes
    a vertical counter that counts the number of horizontal periods defined by the pulse interval of the horizontal synchronization signal thereby to set the length of one vertical period,
    a cycle counter that periodically counts the number of horizontal periods thereby to set each horizontal period to be equal in length to either the first horizontal period or the second horizontal period, and
    a horizontal counter that counts the length of each horizontal period thereby to set the horizontal period to be equal in length to either the first horizontal period or the second horizontal period.

7. The solid-state image pickup apparatus according to claim 6, wherein the cycle counter is initialized in synchronization with the timing of initializing the vertical counter.

8. The solid-state image pickup apparatus according to claim 6, wherein the cycle counter is not initialized when the vertical counter is initialized.

9. The solid-state image pickup apparatus according to claim 6, wherein the synchronization signal generation unit further includes a fraction row counter that counts the number of the second horizontal periods,
    and wherein the cycle counter is initialized when the count value of the fraction row counter reaches a predetermined value.

10. An image pickup system comprising:
    a solid-state image pickup apparatus according to claim 1; and
    a lens that forms an optical image on the solid-state image pickup apparatus.

11. A method of driving a solid-state image pickup apparatus including a pixel array in which pixels each including photoelectric conversion element for converting light into a charge are disposed in a matrix, the method comprising:
    controlling each pixel such that the charge is accumulated in a charge accumulation period starting when the pixel is reset and ending when a pixel signal is read; and outputting a vertical synchronization signal at intervals defining a vertical period and supplying the vertical synchronization signal to the solid-state image pickup apparatus; and outputting a horizontal synchronization signal so as to define a first horizontal period and a second horizontal period having a length different from the length of the first horizontal period, wherein a plurality of first horizontal periods and a plurality of second horizontal periods appear in one vertical period.

\* \* \* \* \*